く12) United States Patent
Hoshina et al.

(10) Patent No.: US 8,603,679 B2
(45) Date of Patent: Dec. 10, 2013

(54) ACTIVE MATERIAL, METHOD OF PRODUCING THE SAME, NONAQUEOUS ELECTROLYTE BATTERY AND BATTERY PACK

(75) Inventors: Keigo Hoshina, Yokohama (JP); Wen Zhang, Sagamihara (JP); Yuki Otani, Saku (JP); Yasuhiro Harada, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/071,046

(22) Filed: Mar. 24, 2011

(65) Prior Publication Data

US 2012/0077074 A1 Mar. 29, 2012

(30) Foreign Application Priority Data

Sep. 27, 2010 (JP) ................................. 2010-215835

(51) Int. Cl.
*H01M 4/48* (2010.01)
*C01G 23/00* (2006.01)
*C01G 23/047* (2006.01)

(52) U.S. Cl.
USPC .......................... 429/231.5; 423/598; 423/610

(58) Field of Classification Search
None
See application file for complete search history.

(56) References Cited

U.S. PATENT DOCUMENTS

2001/0053480 A1* 12/2001 Koga et al. ................. 429/218.1
2007/0287063 A1* 12/2007 Hiratsuka et al. ............ 429/177
2007/0292756 A1* 12/2007 Tsuchiya ..................... 429/209

FOREIGN PATENT DOCUMENTS

JP    2007-149648 A    6/2007
JP    2008-91327       4/2008
JP    2008-117625      5/2008
JP    2010-55855 A     3/2010

OTHER PUBLICATIONS

TiO2(B) as a promising high potential negative electrode for large-size lithium-ion batteries Journal of Power Sources, vol. 189 Iss. 1, Apr. 2009, pp. 580-584.*
Tsutomu Ohzuku, et al., "Electrochemistry of Anatase Titanium Dioxide in Lithium Nonaqueous Cells", Journal of Power Sources, vol. 14, 1985, pp. 153-166.
René Marchand, et al., "TiO$_2$ (B) A New Form of Titanium Dioxide and the Potassium Octatitanate K$_2$ Ti$_8$ O$_{17}$", Material Research Bulletin, vol. 15, 1980, pp. 1129-1133.
U.S. Appl. No. 13/053,913, filed Mar. 22, 2011, Inagaki, et al.
U.S. Appl. No. 13/197,303, filed Aug. 3, 2011, Harada, et al.
Japanese Office Action Issued Nov. 27, 2012 in Patent Application No. 2010-215835 (with English translation).

* cited by examiner

*Primary Examiner* — Ula C Ruddock
*Assistant Examiner* — Matthew Van Oudenaren
(74) *Attorney, Agent, or Firm* — Oblon, Spivak, McClelland, Maier & Neustadt, L.L.P.

(57) ABSTRACT

According to one embodiment, there is provided an active material including a titanium oxide compound having a monoclinic titanium dioxide crystal structure and satisfying the equation (I).

$$S_1/(S_2+S_3) \le 1.9 \qquad (I).$$

In the above equation, $S_1$ is the peak area of a peak existing in a wavelength range from 1430 cm$^{-1}$ to 1460 cm$^{-1}$, $S_2$ is the peak area of a peak existing in a wavelength range from 1470 cm$^{-1}$ to 1500 cm$^{-1}$, and $S_3$ is the peak area of a peak existing in a wavelength range from 1520 cm$^{-1}$ to 1560 cm$^{-1}$, in the infrared diffusion reflective spectrum of the active material after pyridine is absorbed and then released.

12 Claims, 4 Drawing Sheets

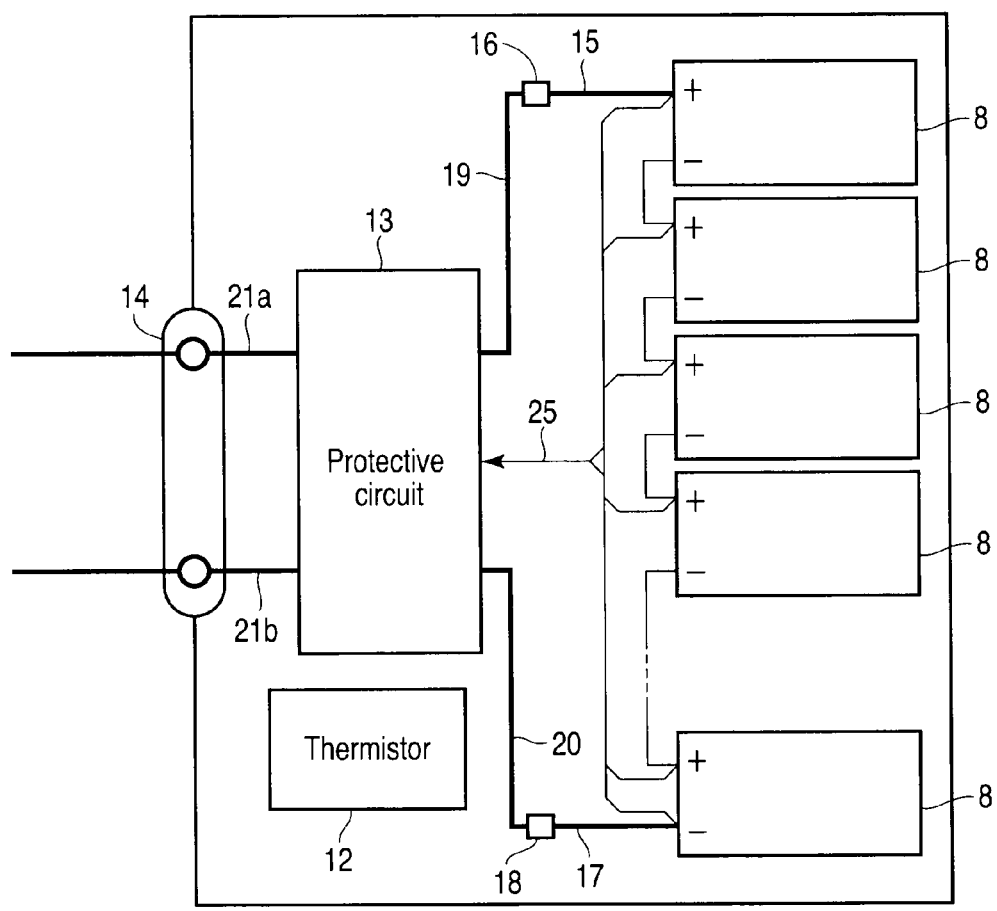
F I G. 4

United States Patent US 8,603,679 B2

ACTIVE MATERIAL, METHOD OF PRODUCING THE SAME, NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2010-215835, filed Sep. 27, 2010; the entire contents of which are incorporated herein by reference.

FIELD

Embodiments described herein relate generally to an active material, a method of producing the active material, a nonaqueous electrolyte battery and a battery pack.

BACKGROUND

A nonaqueous electrolyte battery using titanium oxide as the negative electrode has less possibility of the generation of lithium dendrite than a battery using a carbonaceous material because titanium oxide has a higher Li-absorbing and releasing potential than that of the carbonaceous material. Also, titanium oxide is resistant to thermorunaway because titanium oxide is ceramics. This is the reason why a nonaqueous electrolyte battery using titanium oxide as the negative electrode is highly safe. Especially, a lithium titanate having spinel structure is not varied in volume by a charge-discharge reaction and is therefore a promising material as a negative electrode active material having excellent cycle characteristics and high safety. However, a nonaqueous electrolyte battery using titanium oxide has the problem that it has a low energy density. For example, the theoretical capacity of titanium dioxide having an anatase structure is about 160 mAh/g and the theoretical capacity of lithium-titanium complex oxide having a spinel structure such as $Li_4Ti_5O_{12}$ is about 170 mAh/g.

In light of this situation, much attention is now focused on a titanium oxide compound having a monoclinic titanium dioxide crystal structure. The reversible capacity of the titanium oxide compound having a monoclinic titanium dioxide crystal structure is about 240 mAh/g which is a significantly higher than those of other titanium oxide compounds.

However, when the titanium oxide compound having a monoclinic titanium dioxide crystal structure is used as the negative electrode, this poses a problem concerning a reduced cycle life.

BRIEF DESCRIPTION OF THE DRAWINGS

FIG. 4 is a block diagram showing an electric circuit of a battery pack of FIG. 3;

DETAILED DESCRIPTION

Figure 1:
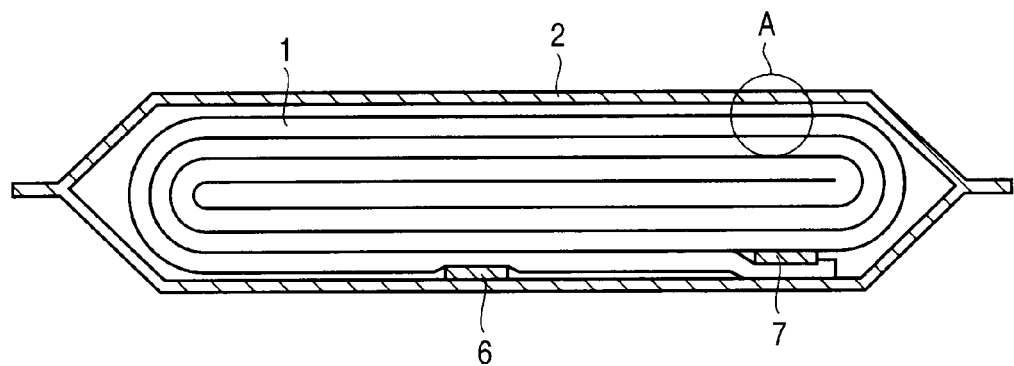
FIG. 1 is a typical sectional view of a thin type nonaqueous electrolyte battery of an embodiment.

In general, according to one embodiment, there is provided an active material comprising a titanium oxide compound having a monoclinic titanium dioxide crystal structure and satisfying the equation (I).

$$S_1/(S_2+S_3) \le 1.9 \tag{I}$$

wherein $S_1$ is the peak area of a peak existing in a wavelength range from 1430 cm$^{-1}$ to 1460 cm$^{-1}$, $S_2$ is the peak area of a peak existing in a wavelength range from 1470 cm$^{-1}$ to 1500 cm$^{-1}$, and $S_3$ is the peak area of a peak existing in a wavelength range from 1520 cm$^{-1}$ to 1560 cm$^{-1}$, in the infrared diffusion reflective spectrum of the active material after pyridine is absorbed and then released.

According to another embodiment, there is provided a nonaqueous electrolyte battery comprising a negative electrode comprising the above active material, a positive electrode and a nonaqueous electrolyte.

According to another embodiment, there is provided a battery pack comprising the above nonaqueous electrolyte battery.

According to a still another embodiment, there is provided a method of producing the above active material. The production method comprises synthesizing an alkali titanate compound by mixing a compound containing Ti and a compound containing an alkali element and heating, obtaining a protonic titanate compound by reacting the alkali titanate compound with an acid to exchange the alkali cation for a proton, and heating the protonic titanate compound at least two times.

According to a still another embodiment, there is provided another method of producing the above active material. The production method comprises synthesizing an alkali titanate compound containing a hetero-element by mixing a compound containing Ti, a compound containing an alkali element and a compound containing a hetero-element and heating, obtaining a protonic titanate compound containing a hetero-element by reacting the alkali titanate compound containing the hetero-element with an acid to exchange the alkali cation for a proton, and producing a titanium oxide compound having a monoclinic titanium dioxide crystal structure and containing a hetero-element by heating the protonic titanate compound containing the hetero-element.

According to a still another embodiment, there is provided another method of producing the above active material. The production method comprises synthesizing a protonic titanate compound by reacting an alkali titanate compound with an acid to exchange the alkali cation for a proton, producing titanium oxide compound particles having a monoclinic titanium dioxide crystal structure by heating the protonic titanate compound, dispersing the titanium oxide compound particles in a solution containing a basic material and a surfactant, and separating the titanium oxide compound to which the basic material is adhered from the solution.

Hereinafter, an active material for battery according to an embodiment will be explained in detail.

First Embodiment

According to this embodiment, there is provided an active material comprising a titanium oxide compound having a monoclinic titanium dioxide crystal structure and satisfying the equation (I).

$$S_1/(S_2+S_3) \le 1.9 \tag{I}$$

wherein $S_1$ is the peak area of a peak existing in a wavelength range from 1430 cm$^{-1}$ to 1460 cm$^{-1}$, $S_2$ is the peak area of a peak existing in a wavelength range from 1470 cm$^{-1}$ to 1500 cm$^{-1}$, and $S_3$ is the peak area of a peak existing in a wavelength range from 1520 cm$^{-1}$ to 1560 cm$^{-1}$, in the infrared diffusion reflective spectrum of the active material after pyridine is absorbed and then released.

Here, the monoclinic titanium dioxide crystal structure is referred to as TiO$_2$(B). Also, the titanium oxide compound having a monoclinic titanium dioxide crystal structure is referred to as a titanium oxide compound having a TiO$_2$(B) structure.

The crystal structure represented by TiO$_2$(B) belongs primarily to the space group C2/m, showing a tunnel structure. Incidentally, the detailed crystal structure of TiO$_2$(B) is described in R. Marchand, L. Brohan, M. Tournoux, Material Research Bulletin 15, 1129 (1980). The titanium oxide compound having a TiO$_2$(B) structure may be represented by the formula Li$_x$TiO$_2$ (0≤x≤1). In this case, x in the above formula is varied between 0 and 1 by a charge-discharge reaction.

It is considered that the capacity of a battery can be raised by using the titanium oxide compound having a TiO$_2$(B) structure as the active material because the titanium oxide compound has a high theoretical capacity.

However, the titanium oxide compound having a TiO$_2$(B) structure is a solid acid and has a solid acid point and a hydroxyl group on its surface and therefore has high reactivity with a nonaqueous electrolyte. For this, in a battery using the titanium oxide compound having a TiO$_2$(B) structure as the negative electrode active material, excess inorganic or organic coating films are formed on the negative electrode by a charge-discharge reaction, leading to increased resistance and reduced output performance. This leads to deteriorated electrode performance, a rise in the internal resistance of the battery and deterioration in the nonaqueous electrolyte, which are the causes of shortened cycle life of the battery.

In a battery using a carbonaceous material or lithium titanate as the negative electrode active material, a side-reaction between the negative electrode and the nonaqueous electrolyte can be limited by adding vinylene carbonate to the nonaqueous electrolyte. In a battery like this, this vinylene carbonate is reduction-decomposed on the negative electrode to form a stable coating film on the negative electrode, whereby the excess formation of a coating film can be limited. However, in the battery using the titanium oxide compound having a TiO$_2$(B) structure as the negative electrode active material, the reaction between the negative electrode and the nonaqueous electrolyte cannot be limited but the formation of a coating film is continued even if vinylene carbonate is added. There are therefore problems concerning increase in resistance and reduction in cycle life.

The inventors have found that the increase in the resistance of a battery can be limited and the cycle life can be improved by using an active material comprising the titanium oxide compound having a TiO$_2$(B) structure and satisfying the equation $S_1/(S_2+S_3) \leq 1.9$ in the infrared diffusion reflective spectrum of the active material after pyridine is absorbed and then released.

Here, $S_1$ is the peak area of a peak existing in a wavelength range from 1430 cm$^{-1}$ to 1460 cm$^{-1}$, $S_2$ is the peak area of a peak existing in a wavelength range from 1470 cm$^{-1}$ to 1500 cm$^{-1}$, and $S_3$ is the peak area of a peak existing in a wavelength range from 1520 cm$^{-1}$ to 1560 cm$^{-1}$, in the infrared diffusion reflective spectrum.

In the infrared diffusion reflective spectrum after the active material is made to absorb and release pyridine, the peak existing in a wavelength range from 1430 cm$^{-1}$ to 1460 cm$^{-1}$ is considered to be a peak derived from a Lewis acid point. Also, the peak existing in a wavelength range from 1470 cm$^{-1}$ to 1500 cm$^{-1}$ is considered to be a peak derived from a Brønsted acid point and a Lewis acid point. Also, the peak existing in a wavelength range from 1520 cm$^{-1}$ to 1560 cm$^{-1}$ is considered to be a peak derived from a Brønsted acid point.

The Lewis acid point accepting a proton can be distinguished from the Brønsted acid point donating a proton in the infrared diffusion reflective spectral method, by measuring the active material which absorbed pyridine and then released it.

It is considered that a titanium oxide compound having a TiO$_2$(B) structure reacts with a solvent and a lithium salt contained in a nonaqueous electrolyte due to the Lewis acid point, with the result that excess coating film is formed. However, the active material having a $S_1/(S_2+S_3)$ value of 1.9 or less while it contains the titanium oxide compound having a TiO$_2$(B) structure is reduced in the influence of the Lewis acid point and therefore limited in the reactivity with the nonaqueous electrolyte. Therefore, an increase in resistance can be limited and the cycle life of the battery can be improved by using such an active material.

In this case, it is considered that the Brønsted acid point does not much contribute to the reaction with the nonaqueous electrolyte, and also, even in the case where the influence of the Lewis acid point of the active material is reduced, the influence of the Brønsted acid point is not relatively reduced. Therefore, the peak derived from a Brønsted acid point and Lewis acid point and the peak derived from a Brønsted acid point may be used as a standard representing the influence of a Lewis acid point.

The $S_1/(S_2+S_3)$ value is preferably 0.5 or more to reduce the influence of both of the Lewis acid point and Brønsted acid point.

The titanium oxide compound having a TiO$_2$(B) structure and contained in the active material in this embodiment may contain a hetero-element. When the hetero-element is contained, the influence of a Lewis acid point on the surface of the titanium oxide compound is limited. As the hetero-element, at least one element selected from Zr, Nb, Mo, Ta, Y, P, and B may be used.

The hetero-element is preferably contained in an amount range from 0.01 to 8% by mass based on the total mass of the titanium oxide compound having a TiO$_2$(B) structure and containing the hetero-element. When the hetero-element is contained in an amount of 0.01% by mass or more, the influence of the Lewis acid point can be reduced. The hetero-element is preferably contained in an amount of 8% by mass or less from the viewpoint of solid-solubility limit of the hetero-element. The hetero-element is more preferably contained in an amount of 0.05 to 3% by mass.

The content of the hetero-element in the titanium oxide compound having a TiO$_2$(B) structure and containing the hetero-element can be measured by the induction coupling plasma (ICP) emission spectral analysis method.

The titanium oxide compound having a TiO$_2$(B) structure and contained in the active material in this embodiment may be one to which a basic material is adhered. When at least a part of the surface of the titanium oxide compound having a TiO$_2$(B) structure is coated with a basic material, the influence of the Lewis acid point on the surface of the titanium oxide compound is limited.

A basic polymer may be used as the basic material. Examples of the basic polymer include a polybenzoimidazole and polyvinylpyridine.

The content of the basic material is 0.01% to 2% by mass based on the total mass of the titanium oxide compound which has a $TiO_2(B)$ structure and to which the basic material is adhered. When the content of the basic material is 0.01% by mass or more, the influence of a Lewis acid point can be limited. Also, when the content of the basic material is 2% by mass or less, side-reactions can be limited without inhibiting the insertion and release of the lithium in charge-discharge operations. The content of the basic material is more preferably 0.01% to 1% by mass.

In the titanium oxide compound which has a $TiO_2(B)$ structure and to which the basic material is adhered, the content of the basic material can be measured by thermogravimetric analysis (TG). A difference in weight between the titanium oxide compound to which no basic material is adhered and the titanium oxide compound to which the basic material is adhered in TG measurement is the weight of the basic material.

When the basic material is adhered to the titanium oxide compound having a $TiO_2(B)$ structure, the intensity of the peak derived from a Brønsted acid and Lewis acid and the intensity of the peak derived from a Brønsted acid besides the intensity of the peak derived from a Lewis acid are reduced in the infrared diffusion reflective spectrum. However, the degree of reduction in each of these peak intensities is smaller than the degree of reduction in the intensity of the peak derived from the Lewis acid and therefore, the $S_1/(S_2+S_3)$ value may be reduced to 1.9 or less.

(Infrared Diffusion Reflective Spectral Method)

The method of measuring an infrared diffusion reflective spectrum will be explained.

First, an active material which is a subject of measurement is put in a sample cup, which is then set to a diffusion reflectometer. The active material is heated to 500° C. and kept at temperature for one hour while flowing nitrogen gas at a rate of 50 mL/min. Then, the temperature is dropped to ambient temperature and then raised again to 100° C. After that, the pressure in the cell in which the sample cup is placed is reduced, pyridine vapor is introduced into the cell and adsorbed for 30 minutes.

Then, the temperature of the sample is kept at 100° C. for one hour while flowing nitrogen gas at a rate of 100 mL/min and then, raised to 150° C. at which the sample is kept for one hour. Pyridine which is physically adsorbed to or hydrogen-bonded with the active material is released by this treatment. Then, the infrared diffusion reflection of the sample is measured.

In the obtained spectrum, the background is eliminated to find a peak area. The peak area is found by drawing a base line between both ends of the peak.

According to such an infrared diffusion reflective spectral method, functional groups present in the sample are identified and therefore, the constitution of the measured sample can be clarified.

When the active material contained in the electrode is measured, the active material is extracted from the electrode and subjected to a test. For example, a layer containing the active material is peeled from the current collector and heat-treated to remove a polymer material, conductive agent, and the like, thereby enabling extraction of the active material from the electrode. Alternately, a layer containing the active material may be peeled from the current collector and then, a polymer material is removed by the Soxhlet extraction method, making it possible to extract the active material and carbon material. In the Soxhlet extraction method, N-methylpyrrolidone (NMP) may be used as the solvent, thereby removing the polymer material from the electrode. In a mixture of the active material and carbon material extracted by Soxhlet method, the carbon material may be oxidized by oxygen or ozone to remove it in the form of carbon dioxide, thereby extracting only the active material.

(Specific Surface Area)

The specific surface area of the titanium oxide compound having a $TiO_2(B)$ structure is preferably 5 $m^2/g$ to 100 $m^2/g$. When the specific surface area is 5 $m^2/g$ or more, lithium ion-absorbing/releasing sites can be sufficiently secured, enabling the production of a higher capacity battery. When the specific surface area is 100 $m^2/g$ or less, coulomb efficiency in charge-discharge operations can be improved.

The above embodiment can provide an active material which can realize a nonaqueous electrolyte battery limited in the increase of resistance and improved in cycle life.

Second Embodiment

A method of producing an active material which comprises a titanium oxide compound having a $TiO_2(B)$ structure and satisfies the equation (I) will be explained.

(First Method)

A first method comprises the steps of synthesizing an alkali titanate compound by mixing a compound containing Ti and a compound containing an alkali element and heating, obtaining a protonic titanate compound by reacting the alkali titanate compound with an acid to exchange the alkali cation for a proton, and heating the protonic titanate compound at least two times.

First, a compound containing Ti and a compound containing an alkali element are used as starting materials. These starting materials are mixed in a predetermined stoichiometric ratio and the mixture is heated to synthesize an alkali titanate compound. The crystal of the alkali titanate compound synthesized here may have any form. The heat treatment may be carried out at 800 to 1100° C.

As the compound containing Ti among the starting materials, one or more compounds selected from $TiO_2$ having anatase structure and $TiO_2$ having rutile structure and $TiCl_4$ may be used. A compound containing Na, K or Cs may be used as the compound containing an alkali element. For example, one or more compounds selected from carbonates, hydroxides and chlorides may be used.

Next, proton exchange is made by acid treatment. First, an alkali titanate compound is washed with distilled water to remove impurities. After that, the alkali titanate compound is acid-treated to exchange the alkali cation of the alkali titanate compound for a proton, thereby obtaining a protonic titanate compound. As to alkali titanate compounds such as sodium titanate, potassium titanate and cesium titanate, their alkali cations can be exchanged for protons without breaking its crystal structure.

The acid treatment may be carried out by adding an acid to the alkali titanate compound powder, followed by stirring. As the acid, an acid selected from hydrochloric acid, nitric acid and sulfuric acid may be used in a concentration of 0.5 to 2 M. The acid treatment is preferably continued until the alkali cations are exchanged sufficiently for protons. As to the acid-treatment time, the acid treatment is carried out preferably for 24 hours or more and more preferably for 1 to 2 weeks at ambient temperature of about 25° C. though no particular limitation is imposed on that time. Further, the acid solution is preferably exchanged for a new one every 24 hours. The acid treatment is carried out in the following condition; temperature: ambient temperature, acid to be used: 1 M sulfuric acid, treating time: 24 hours.

For example, the proton exchange can be exchanged more smoothly by carrying out acid treatment with applying vibration like ultrasonic, so that a protonic titanate compound in good state can be obtained.

Also, it is also preferable to mill the alkali titanate compound in advance by using a ball mill or the like to make proton exchange more efficiently. The milling may be carried out using zirconia balls about 10 to 15 mm in diameter per 100 cm$^2$ of a container which is rotated at 600 to 1000 rpm for about 1 to 3 hours. The alkali titanate compound can be sufficiently milled by carrying out milling for 1 hour or more. If the milling time is designed to be 3 hours or less, such a phenomenon that compounds different from an object product are generated by a mechanochemical reaction can be prevented.

After the proton exchange is finished, an alkaline solution such as an aqueous lithium hydroxide solution is added to neutralize the residual acid. The obtained protonic titanate compound is washed with distilled water and then dried. It is preferable to wash the protonic titanate compound until the pH of the washed water falls into a range from 6 to 8. In the meantime, the process is allowed to proceed to the next step without the neutralization of the residual acid after the acid treatment, and without washing with water and drying.

Then, the protonic titanate compound is heat-treated at least two times. A first heat-treatment is carried out at a temperature range from 350 to 500° C. for 1 to 3 hours. Then, the obtained titanium oxide is subjected to a second heat-treatment. The second heat-treatment is carried out at a temperature range from 200 to 300° C. for 1 to 24 hours. Further heat-treatments may be repeated at a temperature range from 200 to 300° C.

When the titanium oxide obtained by burning the protonic titanate compound is further heat-treated at a relatively lower temperature, the surface properties of the titanium oxide are changed, with the result that the value of $S_1/(S_2+S_3)$ can be made to be 1.9 or less.

The titanium oxide compound having a $TiO_2(B)$ structure obtained by the above method may contained Li in advance by using a compound containing Li as the starting material. Alternatively, it may be one which absorbs Li by charge-discharge operations.

According to the first method described above, a titanium oxide compound can be produced which has a $TiO_2(B)$ structure and a $S_1/(S_2+S_3)$ value of 1.9 or less.

(Second Method)

A method of producing an active material by compounding a hetero-element in a titanium oxide compound having a $TiO_2(B)$ structure will be explained as a second method. The method comprises the steps of synthesizing an alkali titanate compound containing a hetero-element by mixing a compound containing Ti, a compound containing an alkali element and a compound containing a hetero-element and heating, and obtaining a protonic titanate compound containing a hetero-element by reacting the alkali titanate compound containing a hetero-element with an acid to exchange the alkali cation for a proton, and producing a titanium oxide compound having a monoclinic titanium dioxide crystal structure and containing a hetero-element by heating the protonic titanate compound containing a hetero-element.

First, a compound containing Ti, a compound containing an alkali element and a compound containing a hetero-element are used as starting materials. These starting materials are mixed in a predetermined stoichiometric ratio and heated to synthesize an alkali titanate compound containing a hetero-element. The alkali titanate compound synthesized here may have any crystal form. The heat-treatment may be carried out at 800 to 1100° C., though this embodiment is not limited to this.

As the compound containing Ti and the compound containing an alkali element among the starting materials, those described in the above first method may be used.

As the compound containing a hetero-element, a compound containing at least one element selected from Zr, Nb, Mo, Ta, Y, P and B may be used and one or more compounds selected from, for example, carbonates and hydroxides may be used.

Examples of the alkali titanate compound containing a hetero-element include, though not limited to, sodium titanate, potassium titanate, and cesium titanate containing a hetero-element.

Next, proton exchange is made by acid treatment. First, an alkali titanate compound containing a hetero-element is washed with distilled water to remove impurities. After that, the alkali titanate compound is acid-treated to exchange the alkali cation of the alkali titanate compound for a proton, thereby obtaining a protonic titanate compound containing a hetero-element. As to alkali titanate compounds such as sodium titanate, potassium titanate and cesium titanate, their alkali cations can be exchanged for protons without breaking its crystal structure, and this is the same to the alkali titanate compounds containing a hetero-element.

The acid treatment may be carried out by adding an acid to the alkali titanate compound powder, followed by stirring. As the acid, an acid selected from hydrochloric acid, nitric acid and sulfuric acid may be used in a concentration of 0.5 to 2 M. The acid treatment is preferably continued until the alkali cations are exchanged sufficiently for protons. As to the acid-treatment time, the acid treatment is carried out preferably for 24 hours or more and more preferably for 1 to 2 weeks when the acid treatment is carried out at ambient temperature of about 25° C. by using hydrochloric acid having a concentration of about 1 M though no particular limitation is imposed on that time. Further, the acid solution is preferably exchanged for a new one every 24 hours. As described in the first method, the acid treatment may be performed with applying vibration such as ultrasonic. Also, the alkali titanate compound may be preferably milled in advance by a ball mill to undergo the proton exchange more efficiently.

After the proton exchange is finished, an alkaline solution such as an aqueous lithium hydroxide solution is optionally added to neutralize the residual acid. The obtained protonic titanate compound containing a hetero-element is washed with distilled water and then dried. It is preferable to wash the protonic titanate compound until the pH of the washed water falls into a range from 6 to 8. In the meantime, the process is allowed to proceed to the next step without the neutralization of the residual acid after the acid treatment, and without washing with water and drying.

Then, the protonic titanate compound containing a hetero-element is heat-treated to obtain a titanium oxide compound which contains a hetero-element and has a $TiO_2(B)$ structure.

The heat treating temperature is preferably in a range from 250 to 500° C. though it is determined properly depending on the protonic titanate compound because the optimal temperature differs depending on the conditions such as the composition, particle size and crystal form of the protonic titanate compound. When the heat treating temperature is 250° C. or more, the titanium oxide compound has high crystallinity, the generation of an impurity phase of $H_2Ti_8O_{17}$ is limited and the titanium oxide compound is superior in electrode capacity, charge-discharge efficiency and repetitive characteristics. When the heat treating temperature is 500° C. or less on the other hand, the generation of impurity phases of $H_2Ti_8O_{17}$ and $TiO_2$ having anatase structure is limited and therefore, a reduction in electrode capacity can be prevented. The heat treating temperature is more preferably 300 to 400° C.

The heating time may be set in a range from 30 minutes to 24 hours corresponding to the temperature. In the case where the heating temperature is, for example, 300° C. to 400° C., the heating time may be designed to be for 1 to 3 hours.

According to the second method described above, a titanium oxide compound can be produced which has a $TiO_2(B)$ structure and a $S_1/(S_2+S_3)$ value of 1.9 or less.

(Third Method)

A method of producing an active material by making a basic material adhere to the titanium oxide having a $TiO_2(B)$ structure will be explained as a third method. The method comprises the steps of synthesizing a protonic titanate compound by reacting an alkali titanate compound with an acid to exchange the alkali cation for a proton, producing titanium oxide compound particles having a monoclinic titanium dioxide crystal structure by heating the protonic titanate compound, dispersing the titanium oxide compound particles in a solution containing a basic material and a surfactant, and separating the titanium oxide compound to which the basic material is adhered from the solution.

First, an alkali titanate compound is proton-exchanged by acid treatment in the same manner as in the first method to obtain a protonic titanate compound. Then, the obtained protonic titanate compound is heat-treated in the same manner as in the first method to obtain a titanium oxide compound having a $TiO_2(B)$ structure.

The alkali titanate compound may be, though not limited to, sodium titanate, potassium titanate or cesium titanate. For example, $Na_2Ti_3O_7$, $K_2Ti_4O_9$ or $Cs_2Ti_5O_{11}$ may be used as the alkali titanate compound.

The alkali titanate compound may be synthesized, for example, by the solid phase reaction method in which the compound containing Ti is mixed with the compound containing an alkali element in a predetermined stoichiometric ratio, followed by heating. Potassium titanate (for example, $K_2Ti_4O_9$) may be synthesized, for example, by the flux method. Also, a commercially available alkali titanate compound may be used. As the compound containing Ti and compound containing an alkali element, the same compounds as those used in the first method may be used.

Then, a basic material is made to adhere to the obtained titanate oxide compound particles having a $TiO_2(B)$ structure. The titanium oxide compound particle to which the basic material is adhered may be obtained, for example, by adding a surfactant in a basic material solution, dipping the titanium oxide compound particles having a $TiO_2(B)$ structure in the solution, reducing the pressure in the system arbitrarily and separating the particles from the solution by filtration, followed by drying.

A basic polymer may be used as the basic material. Examples of the basic polymer include a polybenzoimidazole and polyvinylpyridine.

The amount of the basic material to be adhered is 0.01% to 2% by mass based on the total mass of the titanium oxide compound which has a $TiO_2(B)$ structure and to which the basic material is adhered.

The surfactant is optionally selected from anionic surfactants, cationic surfactants and nonionic surfactants. It is preferable to use, for example, trioctyl phosphate which is a nonionic surfactant.

The basic material may be penetrated even into the inside of secondary particles of the titanium oxide compound by dispersing the titanium oxide compound particles in a solution containing the basic material and surfactant, so that the influence of a Lewis acid inside of secondary particles can be suppressed. Accordingly, the third method ensures that a titanium oxide compound more reduced in the influence of a Lewis acid point can be obtained.

In the solution containing the basic material and surfactant, the concentration of the surfactant is preferably, though not limited to, 0.1% to 2% by mass.

In a modification of the third method, a titanium oxide compound which has a $TiO_2(B)$ structure and to which a basic material is adhered can be obtained by manufacturing an electrode using a titanium oxide compound having a $TiO_2(B)$ structure, a basic material and a surfactant.

This method comprises the steps of dispersing titanium oxide compound having a $TiO_2(B)$ structure in a solution containing a basic material and a surfactant to prepare a dispersion solution, and preparing an electrode-making slurry by using this dispersion solution. The obtained slurry is applied to one or both surfaces of a metal foil which functions as a current collector, followed by drying and pressing to obtain an electrode.

In the electrode produced in such a production method, the basic material is adhered to at least a part of the surface of the titanium oxide compound having a $TiO_2(B)$ structure. The influence of a Lewis acid point of the titanium oxide compound can therefore be limited.

(Powder X-Ray Diffraction)

Whether the titanium oxide compound obtained in the above first and second method has a $TiO_2(B)$ structure or not can be determined by powder X-ray diffraction using Cu—Kα as the light source.

The powder X-ray diffraction measurement can be made in the following manner. First, an object sample is ground until the average particle diameter reaches about 5 μm. The average particle diameter can be found by the laser diffraction method. The ground sample is filled in a holder part which is formed on a glass sample plate and has a depth of 0.2 mm. At this time, much care is necessary to fill the holder part fully with the sample. Also, special care should be taken to avoid cracking and formation of voids caused by insufficient filling of the sample. Then, a separate glass plate is used to smooth the surface of the sample by sufficiently pressing the separate glass plate against the sample. Much care should be taken to avoid a lack (cracks and voids) in the amount of the sample to be filled, thereby preventing any rise and dent from the basic plane of the glass holder. Then, the glass plate filled with the sample is mounted on the powder X-ray diffractometer to obtain a diffraction pattern by using Cu—Kα rays. Because $TiO_2(B)$ generally has low crystallinity, some samples have weak peak intensities of X-ray diffraction diagram in the powder X-ray measurement so that any one of the peak intensities is observed with difficulty.

The above embodiment ensures that an active material which contains a titanium oxide compound having a $TiO_2(B)$ compound and satisfies the equation (I) can be obtained, enabling a realization of a nonaqueous electrolyte battery limited in the increase of resistance and improved in cycle life.

Third Embodiment

According to the embodiment, a nonaqueous electrolyte battery comprises a negative electrode comprising the active material according to the first embodiment, a positive electrode, a nonaqueous electrolyte, a separator and a container.

Hereinafter, the negative electrode, positive electrode, nonaqueous electrolyte, separator, and container will be explained in detail.

1) Negative Electrode

The negative electrode comprises a current collector and a negative electrode layer (namely, a negative electrode active material-containing layer). The negative electrode layer is formed on one or both surfaces of the current collector and contains an active material, a conductive agent, and a binder.

As the active material, an active material which comprises a titanium oxide compound having a $TiO_2(B)$ structure and satisfies the equation (I) described in the first embodiment is used. This active material is suppressed in the increase of resistance as mentioned above. Therefore, the nonaqueous electrolyte battery can be improved in cycle life by using the negative electrode comprising such an active material.

The conductive agent serves to improve current-collecting performance and to restrain the contact resistance between the active material and the current collector. Examples of the conductive agent include acetylene black, carbon black, graphite, carbon nano-fiber and carbon nanotube.

The binder serves to bind the active material, conductive agent and current collector with each other. Examples of the binder include a polytetrafluoroethylene (PTFE), polyvinylidene fluoride (PVdF), fluoro-rubber, and styrene-butadiene rubber.

The active material, conductive agent, and binder in the negative electrode layer are preferably blended in ratios of 70% to 96% by mass, 2% to 28% by mass and 2% to 28% by mass respectively. When the amount of the conductive agent is 2% by mass or more, the current collecting performance of the negative electrode layer can be improved. Also, when the amount of the binder is 2% by mass or more, the binding strength between the negative electrode layer and the current collector can be improved. On the other hand, the amounts of the conductive agent and binder are respectively preferably 28% by mass or less with the view of developing a high-capacity battery.

The current collector is preferably electrochemically stable in a potential range higher than 1.0 V and is preferably an aluminum foil or an aluminum alloy foil containing at least one element selected from Mg, Ti, Zn, Mn, Fe, Cu, and Si.

The negative electrode can be manufactured by suspending, for example, the active material, conductive agent and binder in a proper solvent to prepare slurry, by applying this slurry to the surface of the current collector and by drying the slurry, followed by pressing. The negative electrode may also be manufactured by forming a pellet essentially consisting of the active material, conductive agent and binder to produce a negative electrode layer-forming material, which is then formed on the current collector.

2) Positive Electrode

The positive electrode comprises a current collector and a positive electrode layer (positive electrode active material-containing layer). The positive electrode layer is formed on one or both surfaces of the current collector and contains an active material, a conductive agent and a binder.

As the active material, for example, oxides or polymers may be used.

Examples of the oxides include oxides which absorb lithium, for example, manganese dioxide ($MnO_2$), iron oxide, copper oxide, nickel oxide, lithium-manganese complex oxides (for example, $Li_xMn_2O_4$ or $Li_xMnO_2$), lithium-nickel complex oxides (for example, $Li_xNiO_2$), lithium-cobalt complex oxides (for example, $Li_xCoO_2$), lithium-nickel-cobalt complex oxides (for example, $LiNi_{1-y}Co_yO_2$), lithium-manganese-cobalt complex oxides (for example, $Li_xM$-$n_yCo_{1-y}O_2$), lithium-nickel-cobalt-manganese complex oxides (for example, $LiNi_{1-y-z}Co_yMn_zO_2$), lithium-nickel-cobalt-aluminum complex oxides (for example, $LiNi_{1-y-z}Co_yAl_zO_2$), lithium-manganese-nickel complex oxides having a spinel structure (for example, $Li_xMn_{2-y}Ni_yO_4$), lithium phosphate having an olivine structure (for example, $Li_xFePO_4$, $Li_xFe_{1-y}Mn_yPO_4$, and $Li_xCoPO_4$), iron sulfate ($Fe_2(SO_4)_3$) and vanadium oxide (for example, $V_2O_5$). Here, x, y, and z preferably satisfy the following equations: $0<x\le1$, $0\le y\le1$ and $0\le z\le1$. As the active material, these compounds may be used either independently or in combinations of two or more.

Examples of the polymer include conductive polymer materials such as a polyaniline and polypyrrole and disulfide type polymer materials.

Also, sulfur (S) or carbon fluoride may be used as the active material.

Preferable examples of the active material include oxides having a positive electrode voltage, for example, lithium-manganese complex oxides ($Li_xMn_2O_4$), lithium-manganese-nickel complex oxides having a spinel structure ($Li_xMn_{2-y}Ni_yO_4$), lithium-nickel complex oxides ($Li_xNiO_2$), lithium-cobalt complex oxides ($Li_xCoO_2$), lithium-nickel-cobalt complex oxides ($Li_xNi_{1-y}Co_yO_2$), lithium-manganese-cobalt complex oxides ($Li_xMn_yCo_{1-y}O_2$), lithium-nickel-cobalt-manganese complex oxides ($LiNi_{1-y-z}Co_yMn_zO_2$) and lithium iron phosphate ($Li_xFePO_4$). Here, x, y, and z preferably satisfy the following equations: $0<x\le1$, $0\le y\le1$ and $0\le z\le1$.

The conductive agent improves the current collecting ability of the active material and reduces the contact resistance between the active material and the current collector. Examples of the conductive agent include carbonaceous materials such as acetylene black, carbon black, graphite, carbon nano-fiber and carbon nanotube.

The binder serves to bind the active material, conductive agent and current collector with each other. Examples of the binder include a polytetrafluoroethylene (PTFE), polyvinylidene fluoride (PVdF) and fluoro-rubber.

The active material, conductive agent and binder in the positive electrode layer are preferably formulated in ratios of 80% to 95% by mass, 3% to 18% by mass and 2% to 17% by mass respectively. The conductive agent can produce the aforementioned effect by blending it in an amount of 3% by mass or more. The decomposition of the nonaqueous electrolyte on the surface of the conductive agent can be reduced by blending it in an amount of 18% by mass or less when the nonaqueous electrolyte is stored at high temperatures. When the amount of the binder is designed to be 2% by mass or more, sufficient strength of the positive electrode can be obtained. When the amount of the binder is 17% by mass or less, the amount of the binder to be formulated as an insulating material in the positive electrode can be reduced, making possible to reduce internal resistance.

The current collector is preferably made of an aluminum foil or aluminum alloy foil containing at least one element selected from Mg, Ti, Zn, Mn, Fe, Cu and Si.

The positive electrode can be manufactured by suspending, for example, the active material, conductive agent and binder in a proper solvent to prepare slurry, by applying this slurry to the surface of the positive electrode current collector and by drying the slurry, followed by pressing. The positive electrode may also be manufactured by forming a pellet essentially consisting of the active material, conductive agent and binder to produce a positive electrode layer, which is formed on the current collector.

3) Nonaqueous Electrolyte

For example, a liquid nonaqueous electrolyte prepared by dissolving an electrolyte in an organic solvent or a gel-like nonaqueous electrolyte prepared by making a complex of a liquid nonaqueous electrolyte and a polymer material may be used as the nonaqueous electrolyte.

The liquid nonaqueous electrolyte is preferably prepared by dissolving the electrolyte in a concentration of 0.5 M to 2.5 M in the organic solvent.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is scarcely oxidized at a high potential and $LiPF_6$ is most preferable.

Examples of the organic solvent include propylene carbonate (PC), ethylene carbonate (EC) and cyclic carbonates such as vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singly or in combinations of two or more.

Preferable examples of the organic solvent include mixture solvents containing two or more solvents selected from a group consisting of propylene carbonate (PC), ethylene carbonate (EC), diethyl carbonate (DEC), dimethyl carbonate (DMC) and methylethyl carbonate (MEC) and mixture solvents containing γ-butyrolactone (GBL). A nonaqueous electrolyte battery having excellent low-temperature characteristics can be obtained by using such mixture solvents.

Examples of the polymer material include a polyvinylidene fluoride (PVdF), polyacrylonitrile (PAN) and polyethylene oxide (PEO).

4) Separator

The separator may be formed of, for example, porous films containing, a polyethylene, polypropylene, cellulose or polyvinylidene fluoride (PVdF) or nonwoven fabrics made of synthetic resins. Porous films formed of a polyethylene or polypropylene is preferably used. These porous films can melt at a fixed temperature to cut off current and can therefore improve safety.

5) Container

A container made of a laminate film 0.5 mm or less in thickness or a metal container 1.0 mm or less in thickness may be used as the container. The metal container preferably has a thickness of 0.5 mm or less.

Examples of the shape of the container include a flat type (thin type), angular type, cylinder type, coin type and button type. As the container, an appropriate one may be selected corresponding to the dimension of the battery. Containers for miniature batteries to be mounted in, for example, mobile electronic devices or package materials for large batteries to be mounted on two-wheel or four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as a polypropylene (PP), polyethylene (PE), nylon and polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy containing one or more elements selected from magnesium, zinc, and silicon. When the alloy contains transition metals such as iron, copper, nickel and chromium, the amount of the transition metals is preferably 100 ppm or less.

Figure 2:
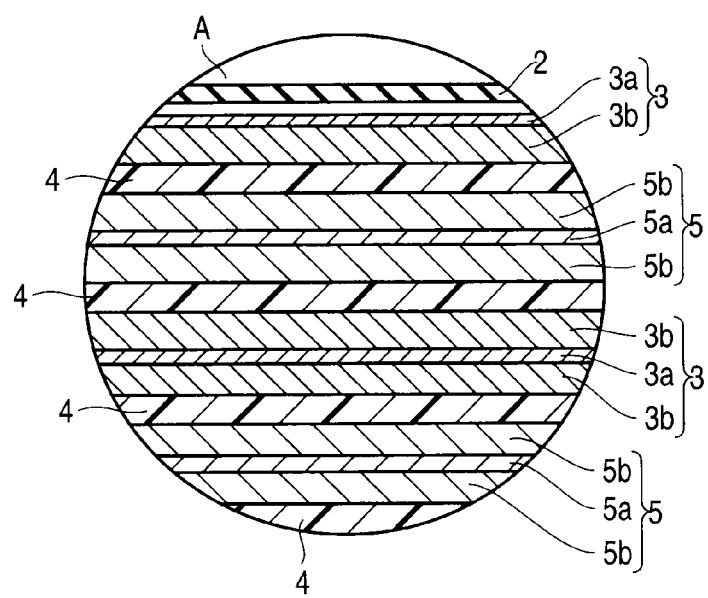
FIG. 2 is an enlarged sectional view of the part A in FIG. 1.

Next, as an example of the nonaqueous electrolyte battery according to the embodiment, a flat-type nonaqueous electrolyte battery provided with a container made of a laminate film will be explained. FIG. 1 is a typical sectional view of the thin-type nonaqueous electrolyte battery and FIG. 2 is an enlarged sectional view of the part A shown in FIG. 1. In this case, each of these drawings is a typical view for explanations and promotion of the understanding of the embodiment. Though there are parts different from an actual battery in shape, dimension and ratio, these structural designs may be properly changed taking the following explanations and known technologies into consideration.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate. The outermost negative electrode 3 has a structure in which as shown in FIG. 2, a negative electrode layer 3b is formed on one of the inside surfaces of a negative electrode current collector 3a. Other negative electrodes 3 each have a structure in which a negative electrode layer 3b is formed on each surface of the current collector 3a. An active material contained in the negative electrode layer 3b contains a titanium oxide compound having a $TiO_2(B)$ structure and satisfies the equation (I) as mentioned in the first embodiment. In the positive electrode 5, a positive electrode layer 5b is formed on each surface of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. These negative electrode terminal 6 and positive electrode terminal 7 are externally extended from an opening part of the baggy container 2. A liquid nonaqueous electrolyte is injected from the opening part of the baggy package material 2. The opening part of the baggy package material 2 is closed by heat sealing with the negative electrode terminal 6 and positive electrode terminal 7 extended out of the opening part to thereby perfectly seal the coil electrode group 1 and liquid nonaqueous electrolyte.

The negative electrode terminal 6 is made of, for example, a material having electric stability and conductivity in a potential range from 1.0 V to 3.0 V with respect to a lithium ion metal. Examples of the material for the negative electrode terminal include aluminum or aluminum alloys containing one or more elements selected from Mg, Ti, Zn, Mn, Fe, Cu and Si. The negative electrode terminal 6 is preferably made of the same material as the negative electrode current collector 3a to reduce the contact resistance with the negative electrode current collector 3a.

The positive electrode terminal 7 is made of, for example, a material having electric stability and conductivity in a potential range from 3.0 V to 4.25 V with respect to a lithium ion metal. Examples of the material for the positive electrode terminal include aluminum and aluminum alloys containing one or more elements selected from Mg, Ti, Zn, Mn, Fe, Cu and Si. The positive electrode terminal 7 is preferably made of the same material as the positive electrode current collector 5a to reduce the contact resistance with the positive electrode current collector 5a.

According to this embodiment, a nonaqueous electrolyte battery can be provided which is limited in the increase of resistance and improved in cycle life.

Fourth Embodiment

Next, a battery pack according to a fourth embodiment will be explained with reference to the drawings. The battery pack comprises one or two or more of the above nonaqueous electrolyte batteries (unit cells) according to the above third embodiment. When the battery pack includes two or more unit cells, these unit cells are disposed in such a manner that they are electrically connected in series or in parallel.

Figure 3:
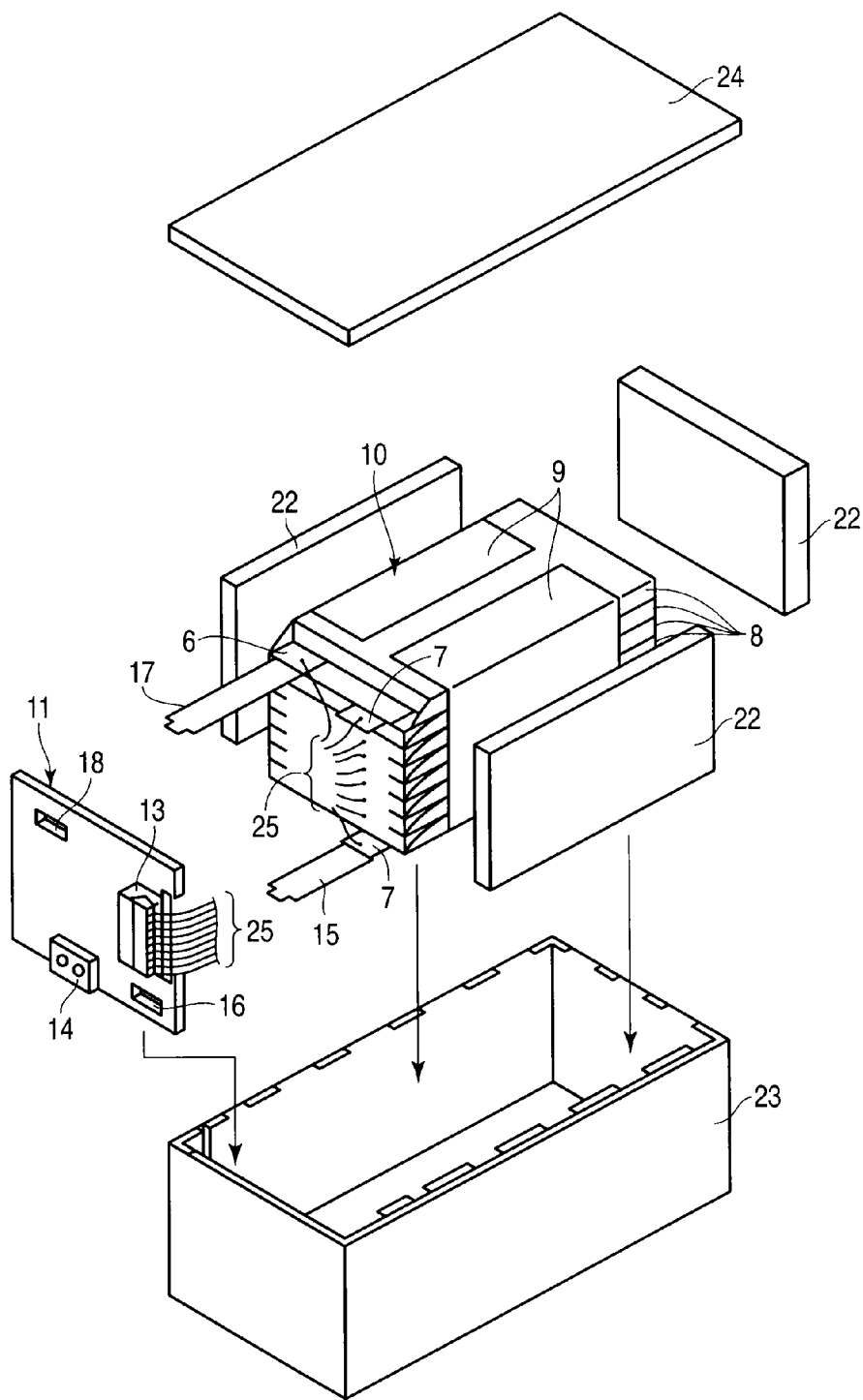
FIG. 3 is an exploded perspective view of a battery pack of an embodiment.

FIGS. 3 and 4 show an example of a battery pack comprising two or more flat-type unit cells. FIG. 3 is an exploded perspective view of the battery pack. FIG. 4 is a block diagram showing an electric circuit of the battery pack shown in FIG. 3.

A plurality of unit cells 8 are laminated such that the externally extended negative electrode terminals 6 and positive electrode terminals 7 are arranged in the same direction and fastened with an adhesive tape 9 to thereby configure a battery module 10. These unit cells 8 are electrically connected in series as shown in FIG. 4.

A printed wiring board 11 is disposed opposite to the side surface of the unit cell 8 from which the negative electrode terminal 6 and positive electrode terminal 7 are extended. As shown in FIG. 4, a thermistor 12, a protective circuit 13 and an energizing terminal 14 connected to external devices are mounted on the printed wiring board 11. An insulating plate (not shown) is attached to the surface of the printed wiring board 11 facing the battery module 10 to avoid unnecessary electrical connection with the wiring of the battery module 10.

A positive electrode side lead 15 is connected with the positive electrode terminal 7 positioned on the lowermost layer of the battery module 10 with its tip being inserted into a positive electrode side connector 16 of the printed wiring board 11 for electrical connection. A negative electrode side lead 17 is connected with the negative electrode terminal 6 positioned on the uppermost layer of the battery module 10 with its tip being inserted into a negative electrode side connector 18 of the printed wiring board 11 for electrical connection. These connectors 16 and 18 are connected to a protective circuit 13 through wirings 19 and 20 formed on the printed wiring board 11.

The thermistor 12 is used to detect the temperature of the unit cell 8 and the detected signals are transmitted to the protective circuit 13. The protective circuit 13 can shut off a plus side wiring 21a and minus side wiring 21b between the protective circuit 13 and the energizing terminal 14 connected to external devices in a predetermined condition. The predetermined condition means, for example, the case where the temperature detected by the thermistor 12 is a predetermined one or higher. Also, the predetermined condition means, for example, the case of detecting overcharge, overdischarge and over-current of the unit cell 8. The detections of this overcharge and the like are made for individual unit cells 8 or whole unit cells 8. When individual unit cells 8 are detected, either the voltage of the battery may be detected or the potential of the positive electrode or negative electrode may be detected. In the latter case, a lithium electrode used as a reference electrode is inserted between individual unit cells 8.

In the case of FIGS. 3 and 4, a wiring 25 for detecting voltage is connected to each unit cell 8 and the detected signals are transmitted to the protective circuit 13 through these wirings 25.

A protective sheet 22 made of a rubber or resin is disposed on each of the three side surfaces of the battery module 10 excluding the side surface from which the positive electrode terminal 7 and negative electrode terminal 6 are projected.

The battery module 10 is accommodated in a receiving container 23 together with each protective sheet 22 and printed wiring board 11. Specifically, the protective sheet 22 is disposed on each inside surface in the direction of the long side and on one of the inside surfaces in the direction of the short side of the receiving container 23, and the printed wiring board 11 is disposed on the other inside surface in the direction of the short side. The battery module 10 is positioned in a space enclosed by the protective sheet 22 and the printed wiring board 11. A lid 24 is attached to the upper surface of the receiving container 23.

Here, a thermally contracting tape may be used in place of the adhesive tape 9 to secure the battery module 10. In this case, after the protective sheet is disposed on both sides of the battery module and the thermally contracting tapes are wound around the battery module; the thermally contracting tape is contracted by heating to fasten the battery module.

The structure in which the unit cells 8 are connected in series is shown in FIGS. 3 and 4. However, with regard to these unit cells 8, either series or series-parallel cell connections may be used to increase the capacity of the battery. The assembled battery packs may be further connected in series or parallel.

Also, the structure of the battery pack is appropriately changed according to its use. The battery pack is preferably used in applications exhibiting excellent cycle characteristics when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to this embodiment, a nonaqueous electrolyte battery having an excellent cycle life is provided and therefore a battery pack improved in cycle life can be provided. Also, a battery pack preferably used for vehicles can be provided by using a nonaqueous electrolyte battery superior in low-temperature characteristics as mentioned in the third embodiment.

EXAMPLES

Example 1

Production of a Negative Electrode

First, a titanium oxide compound having a $TiO_2(B)$ structure was synthesized. Potassium carbonate ($K_2CO_3$), titanium oxide having anatase structure ($TiO_2$) and niobium hydroxide ($Nb_2O_5 \cdot nH_2O$) were used as starting materials. These starting materials were mixed and baked at 1000° C. for 24 hours to synthesize an alkali titanate compound containing Nb (K—Ti—Nb—O compound). This K—Ti—Nb—O compound was dry-milled using zirconia beads to regulate its grain size and then, washed with distilled water to obtain a proton-exchange precursor. This proton-exchange precursor was added to a 1 M hydrochloric acid solution, which was then ultrasonically stirred at 25° C. for one hour. This operation was repeated 12 times with exchanging the hydrochloric acid solution. After the acid treatment was finished, the precursor was washed with distilled water to obtain a protonic titanate compound containing Nb. This protonic titanate compound containing Nb was baked in the air at 350° C. for 3 hours to obtain a titanium oxide compound containing Nb and having a $TiO_2(B)$ structure.

The obtained titanium oxide compound was measured by ICP emission spectral analysis, with the result that the content of Nb was 8% by mass based on the total mass of the Nb-containing titanium oxide compound having a $TiO_2(B)$ structure.

The Nb-containing titanium oxide compound having a $TiO_2(B)$ structure and synthesized in the above manner was used as the negative electrode active material. 90% by mass of a powder of the negative electrode active material, 5% by mass of acetylene black and 5% by mass of a polyvinylidene fluoride (PVdF) were added to NMP and mixed to prepare slurry. This slurry was applied to both surfaces of a current collector made of an aluminum foil 15 μm in thickness and dried, followed by pressing to manufacture a negative electrode having a electrode density of 2.0 $g/cm^3$.

<Production of a Positive Electrode>

A lithium-nickel complex oxide ($LiNi_{0.82}Co_{0.15}Al_{0.03}O_2$) was used as the positive electrode active material, and acetylene black and a polyvinylidene fluoride (PVdF) were used as the conductive agents. 90% by mass of the lithium-nickel complex oxide, 5% by mass of acetylene black and 5% by mass of a polyvinylidene fluoride (PVdF) were added to and mixed with NMP to prepare slurry. This slurry was applied to both surfaces of a current collector made of an aluminum foil 15 μm in thickness and dried, followed by pressing to produce a positive electrode having an electrode density of 3.15 $g/cm^3$.

<Production of an Electrode Group>

The positive electrode, a separator made of an ethylene porous film 25 μm in thickness, the negative electrode and a separator were laminated in this order and spirally coiled. This coiled laminate was pressed under heating at 90° C. to manufacture a flat type electrode group having a width of 30 mm and a thickness of 3.0 mm. The obtained electrode group was accommodated in a pack made of a laminate film, which was then dried under vacuum at 80° C. for 24 hours. The laminate film had a structure in which a polypropylene layer was formed on each side of an aluminum foil 40 μm in thickness and the whole thickness of the laminate was 0.1 μm.

<Preparation of a Liquid Nonaqueous Electrolyte>

Ethylene carbonate (EC) and ethylmethyl carbonate (EMC) were mixed in a ratio by volume of 1:2 to prepare a mixture solvent. 1 M of $LiPF_6$ was dissolved as an electrolyte in this mixture solvent to prepare a liquid nonaqueous electrolyte.

<Production of a Nonaqueous Electrolyte Secondary Battery>

The liquid nonaqueous electrolyte was added to a laminate film pack with an electrode group put therein. After that, the pack was perfectly sealed by heat sealing to produce a nonaqueous electrolyte secondary battery which had a structure as shown in FIG. 1 and a width of 35 mm, a thickness of 3.2 mm and a height of 65 mm.

Example 2

A Nb-containing titanium oxide compound having a $TiO_2$ (B) structure was synthesized in the same manner as in Example 1 except that the mixing ratio of the starting materials was altered to change the content of Nb to 4% by mass and used as the negative electrode active material. A nonaqueous electrolyte battery was produced using this negative electrode active material in the same manner as in Example 1.

Example 3

A titanium oxide compound having a $TiO_2(B)$ structure was synthesized in the same manner as in Example 1 except that potassium carbonate ($K_2CO_3$) and anatase type titanium oxide ($TiO_2$) were used and niobium hydroxide ($Nb_2O_5 \cdot nH_2O$) was not used as the starting materials.

The synthesized titanium oxide compound having a $TiO_2$ (B) structure was dipped in a polybenzoimidazole solution having a concentration of 2% by mass and then, the pressure in the system was reduced. The polybenzoimidazole solution was made to contain 0.5% by mass of trioctyl phosphate as a surfactant. Then, a titanium oxide compound was separated by filtration and dried to obtain a titanium oxide compound having a $TiO_2(B)$ structure and a polybenzoimidazole adhered to the surface thereof. The amount of the polybenzoimidazole adhered to the titanium oxide compound was 0.03% by mass based on the total mass of the titanium oxide compound having a $TiO_2(B)$ structure and the polyimidazole adhered thereto.

This titanium oxide compound having a $TiO_2(B)$ structure and the polyimidazole adhered thereto was used as the negative electrode active material to produce a nonaqueous electrolyte battery in the same manner as in Example 1.

Example 4

A nonaqueous electrolyte battery was produced in the same manner as in Example 3 except that the concentration of the polybenzoimidazole solution was changed to 5% by mass and the content of the polybenzoimidazole was changed to 0.10% by mass.

Comparative Example 1

A titanium oxide compound having a $TiO_2(B)$ structure was synthesized in the same manner as in Example 1 except that potassium carbonate ($K_2CO_3$) and anatase type titanium oxide ($TiO_2$) were used, but niobium hydroxide ($Nb_2O_5 \cdot nH_2O$) was not used as the starting materials. A nonaqueous electrolyte battery was produced using this titanium oxide compound as negative electrode active material in the same manner as in Example 1.

Comparative Example 2

A titanium oxide compound having a $TiO_2(B)$ structure was synthesized in the same manner as in Example 1 except that potassium carbonate ($K_2CO_3$) and titanium oxide having anatase structure ($TiO_2$) were used, but niobium hydroxide ($Nb_2O_5 \cdot nH_2O$) was not used as the starting materials.

The synthesized titanium oxide compound having a $TiO_2$ (B) structure was dipped in a titanium isopropoxide solution having a concentration of 10% by mass and the pressure in the system was reduced. Then, a titanium oxide compound was separated by filtration and heat-treated at 600° C. for 1 hour to obtain a titanium oxide compound with titanium oxide newly adhered to the surface thereof.

A nonaqueous electrolyte battery was produced using this titanium oxide compound as the electrode active material in the same manner as in Example 1.

(Measurement of Infrared Diffusion Reflection)

Each negative electrode active material used in Examples 1 to 4 and Comparative Examples 1 and 2 was subjected to measurement of infrared diffusion reflection by using the aforementioned method to obtain the IR spectrum.

Figure 5:
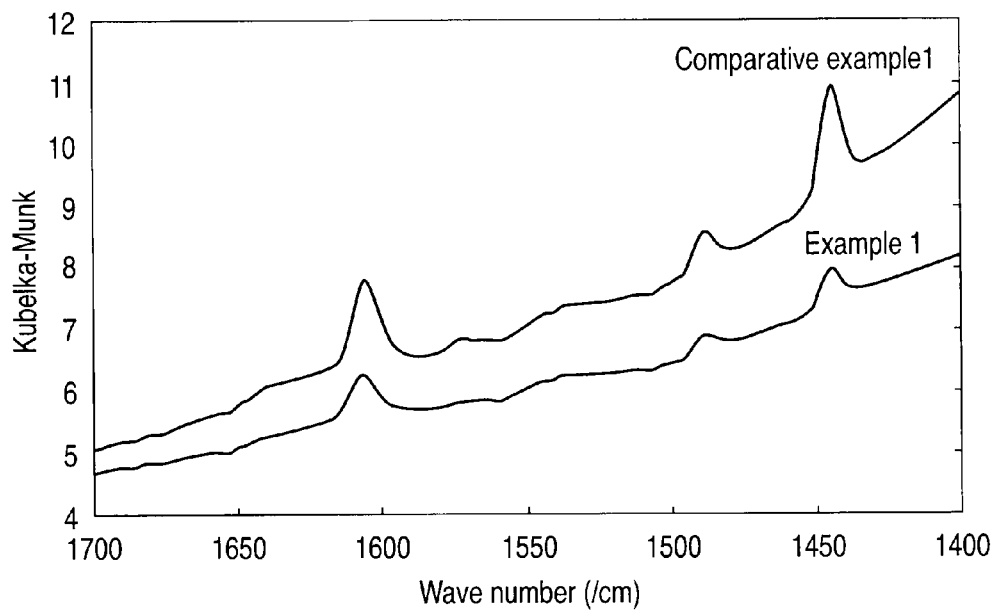
FIG. 5 is an IR spectrums of Example 1 and Comparative Example 1.

FIG. 5 shows the IR spectrums of Example 1 and Comparative Example 1. The peak existing in a wavelength range from 1430 cm$^{-1}$ to 1460 cm$^{-1}$ is considered to be a peak derived from a Lewis acid point. Also, the peak existing in a wavelength range from 1470 cm$^{-1}$ to 1500 cm$^{-1}$ is considered to be a peak derived from a Brønsted acid point and a Lewis acid point. Also, the peak existing in a wavelength range from 1520 cm$^{-1}$ to 1560 cm$^{-1}$ is considered to be a peak derived from a Brønsted acid point.

It is shown that the intensity of the peak derived from a Lewis acid point existing in a wavelength range from 1430 cm$^{-1}$ to 1460 cm$^{-1}$ is more reduced in the IR spectrum of Example 1 than in the IR spectrum of Comparative Example 1. Example 1 relates to a battery using, as the negative electrode active material, the titanium oxide compound which has a TiO$_2$(B) structure and contains Nb, and Comparative Example 1 relates to a battery using, as the negative electrode active material, the titanium oxide compound which has a TiO$_2$(B) structure and which doesn't contain Nb. The intensity of the peak derived from a Lewis acid point is reduced in the IR spectrum of Example 1. This shows that the influence of a Lewis acid is reduced by using the titanium oxide compound having a TiO$_2$(B) structure and containing a hetero-element.

Figure 6:
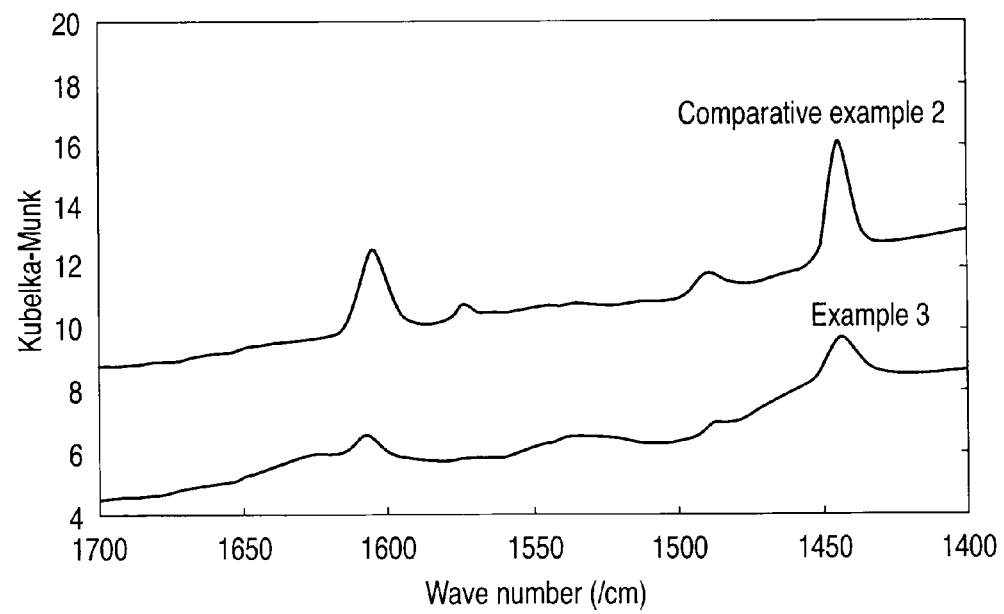
FIG. 6 is an IR spectrums of Example 3 and Comparative Example 2.

FIG. 6 shows the IR spectrums of Example 3 and Comparative Example 2. It is shown that the intensity of the peak derived from a Lewis acid point existing in a wavelength range from 1430 cm$^{-1}$ to 1460 cm$^{-1}$ is more reduced in the IR spectrum of Example 3 than in the IR spectrum of Comparative Example 2. Example 3 relates to a battery using, as the negative electrode active material, the titanium oxide compound which has a TiO$_2$(B) structure and to which a polyimidazole is adhered as the basic material, and Comparative Example 2 relates to a battery using, as the negative electrode active material, the titanium oxide compound which has a TiO$_2$(B) structure and to which a titanium oxide is adhered in place of the basic material. The intensity of the peak derived from a Lewis acid point is reduced in the IR spectrum of Example 3. This shows that the influence of a Lewis acid is reduced by using the titanium oxide compound which has a TiO$_2$(B) structure and to which the basic material is adhered as the negative electrode active material.

(Measurement of Resistance-Increase Ratio after the Cycle Operations)

Using each of the nonaqueous electrolyte secondary batteries of Examples 1 to 4 and Comparative Examples 1 and 2, a charge-discharge operation was repeated 50 times (charge operation and discharge operation=one cycle) to examine the resistance-increase rate. The charge-discharge operation was carried out at 1 C rate in the environment of 45° C. In the charge operation, constant-current and constant-voltage charge operations were carried out at 1 V and the charging time was set to 3 hours. The discharge cutoff voltage was set to 3.0 V to carry out constant-current discharge operations. As to the resistance-increase rate, the resistance of the battery before initial charge-discharge operation was set to 1.0 to calculate the resistance-increase ratio of the battery after 50 cycles from the resistance of the battery after 50 cycles. The value of $S_1/(S_2+S_3)$ of each battery and the resistance-increase ratio $R_{50}/R_0$ after 50 cycles are shown in Table 1.

TABLE 1

| | $S_1$ | $S_2$ | $S_3$ | $S_1/(S_2+S_3)$ | $R_{50}/R_0$ |
|---|---|---|---|---|---|
| Example 1 | 6.06 | 2.43 | 3.61 | 1.00 | 5.27 |
| Example 2 | 8.72 | 2.74 | 3.72 | 1.35 | 6.83 |
| Example 3 | 17.4 | 1.33 | 13.4 | 1.17 | 5.18 |
| Example 4 | 16.8 | 1.73 | 13.4 | 1.11 | 5.66 |
| Comparative Example 1 | 15.1 | 5.05 | 2.92 | 1.91 | 8.75 |
| Comparative Example 2 | 35.9 | 6.96 | 3.38 | 3.46 | 12.40 |

The batteries of Examples 1 and 2 each having a $S_1/(S_2+S_3)$ value of 1.9 or less had a lower resistance-increase ratio than the battery of Comparative Example 1 having $S_1/(S_2+S_3)$ value of 1.91. This shows that the $S_1/(S_2+S_3)$ value can be reduced to 1.9 or less and the resistance-increase ratio can be reduced by using, as the negative electrode active material, the titanium oxide compound having a TiO$_2$(B) structure and containing a hetero-element (Nb).

Also, Example 1 in which the content of Nb was 8% by mass had a lower $S_1/(S_2+S_3)$ value and a lower resistance-increase ratio than Example 2 in which the content of Nb was 4% by mass. This suggests that the resistance-increase ratio can be more reduced by increasing the content of hetero-elements.

Similarly, the batteries of Examples 3 and 4 each having a $S_1/(S_2+S_3)$ value of 1.9 or less had a lower resistance-increase ratio than the battery of Comparative Example 2 having a $S_1/(S_2+S_3)$ value of 3.46. This shows that the $S_1/(S_2+S_3)$ value can be reduced to 1.9 or less and the resistance-increase ratio can be reduced by using, as the negative electrode active material, the titanium oxide compound which has a TiO$_2$(B) structure and comprises the basic material adhered to the surface thereof.

Also, in Comparative Example 2, the active material has a significantly high $S_1/(S_2+S_3)$ value and at the same time, a significantly high resistance-increase rate. It is inferred from the above result that the Lewis acid point is increased, so that the generation of a coating film is promoted by making titanium oxide adhere newly to the surface of the titanium oxide compound having a TiO$_2$(B) structure.

From the above results, it is shown that the resistance-increase ratio of the battery can be reduced and therefore, the cycle life of the battery can be improved by using the active material having a $S_1/(S_2+S_3)$ value of 1.9 or less.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a titanium oxide compound having a monoclinic titanium dioxide crystal structure and satisfying the following equation (I):

$$S_1/(S_2+S_3) \leq 1.9 \quad (I)$$

wherein $S_1$ is the peak area of a peak existing in a wavelength range from 1430 cm$^{-1}$ to 1460 cm$^{-1}$, $S_2$ is the peak area of a peak existing in a wavelength range from 1470 cm$^{-1}$ to 1500 cm$^{-1}$, and $S_3$ is the peak area of a peak existing in a wavelength range from 1520 cm$^{-1}$ to 1560 cm$^{-1}$, in the infrared diffusion reflective spectrum of the active material after pyridine is absorbed and then released.

2. A nonaqueous electrolyte battery comprising:
a negative electrode comprising the active material according to claim 1;
a positive electrode; and
a nonaqueous electrolyte.

3. The battery according to claim 2, wherein the positive electrode comprises at least one complex oxides selected from a lithium-nickel complex oxide and a lithium-manganese complex oxide.

4. A battery pack comprising the nonaqueous electrolyte battery according to claim 2.

5. The active material according to claim 1, wherein the $S_1/(S_2+S_3)$ value is 0.5 or more.

6. The active material according to claim 1, wherein the titanium oxide compound contains at least one element selected from the group consisting of Zr, Nb, Mo, Ta, Y, P and B.

7. The active material according to claim 6, wherein the titanium oxide compound contains the at least one element in an amount of from 0.01 to 8% by mass based on the total mass of the titanium oxide compound.

8. The active material according to claim 6, wherein the titanium oxide compound contains the at least one element in an amount of from 0.05 to 3% by mass based on the total mass of the titanium oxide compound.

9. The active material according to claim 6, wherein the at least one element is Nb.

10. The active material according to claim 1, wherein at least a part of the surface of the titanium oxide compound is coated with a basic material.

11. The active material according to claim 10, wherein the basic material is a basic polymer.

12. The active material according to claim 11, wherein the basic polymer contains polybenzoimidazole and polyvinylpyridine.

* * * * *